United States Patent
Grummon et al.

[15] 3,678,067
[45] July 18, 1972

[54] METHOD FOR PREPARING SELENO-DERIVATIVES OF γ-AMINO ACIDS

[72] Inventors: Glenn D. Grummon, Maplewood; Philip E. Wiegert, St. Louis, both of Mo.

[73] Assignee: Mallinckrodt Chemical Works, St. Louis, Mo.

[22] Filed: Oct. 1, 1969

[21] Appl. No.: 862,916

[52] U.S. Cl. ..................260/482 R, 260/471 A, 260/518 R, 260/519, 260/534 R, 260/534 S, 260/607 R
[51] Int. Cl. ..............................C07c 101/18, C07c 101/44
[58] Field of Search..............260/482, 482 R, 524 S, 524 R, 260/518 R, 519, 471 R

[56] References Cited

OTHER PUBLICATIONS

E. P. Painter, JACS 69, 232–234, (1947).

Primary Examiner—Lorraine A. Weinberger
Assistant Examiner—Paul J. Killos
Attorney—Koenig, Senniger, Powers & Leavitt

[57] ABSTRACT

Good yields of selenomethionine are obtained by reacting sodium methaneselenol with α-amino-γ-bromobutyric acid or one of its esters. The method is particularly suitable for preparing such compounds containing radioactive selenium. Also, optical isomers of the α-amino acid may be employed without racemization of the product. The sodium methaneselenol may conveniently by prepared in the same reaction vessel by reacting dimethyl diselenide with sodium in liquid ammonia. The method is applicable to preparing seleno derivatives of other α-amino acids.

5 Claims, No Drawings

METHOD FOR PREPARING SELENO-DERIVATIVES OF γ-AMINO ACIDS

BACKGROUND OF THE INVENTION

Selenomethionine containing selenium-75 is a known radiodiagnostic agent for detecting abnormalities in the pancreas and parathyroid gland. When administered as an intravenous solution, selenomethionine appears in the pancreas in about 1–2 hours and in the parathyroid gland in about 6–10 hours. Lesions of the pancreas appear as "cold areas". Hyperfunctioning parathyroid adenomas appear as "hot areas".

It is known that selenomethionine can be prepared by heating sodium methaneselenol ($CH_3SeNa$) with α-amino-γ-butyrolacetone. Other workers who have tried this method reported very low yields, and we were unable to obtain yields greater than about 1–2 percent. Other known methods employ sodium benzylselenol ($C_6H_5CH_2SeNa$). The latter reagent suffers from the disadvantage that the benzyl group must subsequently be removed and replaced by a methyl group, an additional step which is particularly objectionable when preparing radioactive selenomethionine-$Se^{75}$.

Moreover, using many of these prior methods, the preparation of the preferred L-selenomethionine, if possible at all, would be extremely difficult.

SUMMARY OF THE INVENTION

Among the objects of the present invention may be noted that the provision of improved methods for preparing selenomethionine and related compounds; the provision of such methods which are particularly advantageous for the preparation of radiodiagnostic agents which contain radioactive selenium and which are optically active. Other objects will be in part apparent and in part pointed out hereinafter.

According to the present invention, compounds conforming to the formula

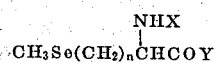

where n is a number from 1 to 3,
X is hydrogen and or —COR with R being selected from hydrogen and alkyl, aryl, aralkyl and aralkoxy groups,
y is selected from from OH and OR where R is alkyl are prepared by reacting an alkali metal methaneselenol with a halogenated α-amino acid conforming to the formula

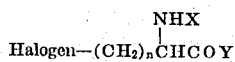

The methaneselenol may be prepared in the same reaction vessel by reacting dimethyl diselenide with sodium and liquid ammonia.

DESCRIPTION OF THE PREFERRED EMBODIMENTS

In a preferred embodiment of the invention, methyl α-amino-γ-bromobutyrate hydrobromide (II) or other lower aliphatic ester of the acid is reacted with sodium methaneselenol (I) in the presence of sodium methoxide using methanol as a solvent. The reaction mixture contains sufficient sodium alkoxide to split off the hydrogen bromide thereby forming the free ester as well as to effect condensation between the acid and the methaneselenol. It will be understood that sodium may be replaced by potassium or lithium and that methanol may be replaced by another lower monohydric alcohol such as ethanol, isopropanol and the like. The reaction may be represented as follows:

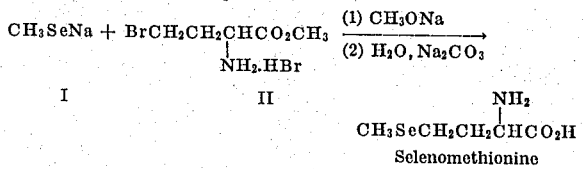

The sodium methaneselenol for the above reaction is conveniently produced by the reduction of dimethyl diselenide with sodium in liquid ammonia:

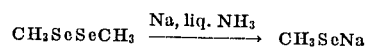

Both reactions may be carried out consecutively in the same reaction vessel as in the following detailed example:

A total of 10.01 g. dimethyl diselenide (0.0534 mole) was diluted with 75 ml. of liquid ammonia and 2.5 g. of metallic sodium (0.108 g. atom) was then added in small increments. With the addition of the last piece of sodium, the characteristic blue color persisted for some 30 minutes. Then the ammonia was allowed to evaporate and the system flushed with nitrogen until no ammonia was detected. To the resulting sodium methaneselenol was added a solution of sodium methoxide (2.5 g. of sodium in 150 ml. of methanol) and then a total of 29.2 g. of methyl α-amino-γ-bromo-butyrate hydrobromide (0.1055 mole) in 100 ml. of methanol. The resulting grey mixture was stirred overnight without heating. The mixture (pH 8.5) was diluted with 100 ml. of water, brought to reflux, and 11 g. sodium carbonate (0.105 mole) was added. This mixture was allowed to reflux for one hour and the methanol was then allowed to evaporate. With the volume at 120 ml., the solution was made acid with hydrochloric acid and a small amount of red precipitate was filtered off. The pH was brought to 7 with sodium hydroxide. The resulting precipitate was recrystallized from 50 percent aqueous ethanol, and three successive crops of selenomethionine totalling 14.04 g. (65.2 percent) were collected. These crops were combined, dissolved in 450 ml. of hot water, treated with 1.0 g. of activated carbon, filtered, and cooled to give a total of 8.21 g. of selenomethionine, a yield of 40 percent.

In place of the methyl ester of α-amino-γ-bromobutryic acid, other lower aliphatic esters such as the ethyl and propyl ester or the free acid may be used.

To prepare selenomethionine-$Se^{75}$ in accordance with the present invention, the dimethyl diselenide-$Se^{75}$ may be prepared from sodium selenite-$Se^{75}$ as follows. Sulfur dioxide is passed through an acidified aqueous solution of the sodium selenite whereupon red selenium is precipitated in the form of a very reactive spongy amorphous solid. The pH of the mixture is adjusted to about 8–10 and the selenium is converted to selenosulfate with potassium sulfite. The resulting solution is then made strongly basic, dimethyl sulfate is added and the desired dimethyl diselenide is recovered by steam distillation. This intermediate is then used to prepare selenomethionine-$Se^{75}$ as before.

To 0.219 g. of radioactive sodium selenite-$Se^{75}$ is added 10 ml. of a mixture of 10 percent sulfuric acid in 6N hydrochloride acid (made by adding 1.0 ml. of concentrated sulfuric acid to 4.0 ml. of water and diluting to 10.0 ml. with concentrated hydrochloric acid) in a 40-ml. centrifuge tube. Anhydrous sulfur dioxide is passed through the solution for 1 hour, the tube is centrifuged, the supernatent liquid is removed, and the precipitate is washed twice with 10 ml. portions of water. The yield of precipitated red selenium by this method is essentially quantitative. From it potassium selenosulfate is prepared as follows: The selenium is slurried in 1.0 ml. of water and the pH is adjusted to 8—10 with 5 percent potassium hydroxide. Then 0.4 of potassium sulfite (100 percent excess) is added to the centrifuge tube and the mixture is warmed to dissolve the selenium. When the selenium has largely or completely dissolved, the solution is transferred to a 50 ml., three-necked, round-bottom flask equipped with heating mantle, distillation, condenser, and addition funnel. The transfer is completed by washing the centrifuge tube with 1 ml. of water and the resulting solution is heated to reflux for 7 minutes. The solution is made alkaline with 2.1 ml. of 5 percent potassium hydroxide solution (equivalent to 0.107 g. of 85 percent potassium hydroxide pellets). Then while the solution is still refluxing 1.0 ml. of dimethyl sulfate is added dropwise over a 5 minutes period while dimethyl diselenide is collected by steam distillation. When half of the dimethyl sulfate has been added, the reaction mixture becomes acid as evidenced by the formation of an orange emulsion in the flask. Heating is continued until all the dimethyl diselenide has been steam-distilled as shown by the disappearance of color in the flask. Finally, 5 ml. of pentane is slowly added through the addition funnel to aid in washing over dimethyl diselenide in the condenser. The distillation receiver contains a water layer and a pentane layer with dimethyl diselenide in the pentane layer. The mixture is transferred to a stoppered 10 ml. ground-glass mixing cylinder using 5 ml. of pentane to aid in the transfer. The aqueous layer is removed with a pipette and the pentanedimethyl diselenide layer is washed with 10 ml. of 1 percent sodium bicarbonate. The aqueous layer is again removed and the pentane layer is dried with 2 g. of anhydrous magnesium sulfate. The magnesium sulfate is filtered off and washed with ca. 10 ml. of pentane. The resulting pentane solution of dimethyl diselenide contains 75–80 percent of radioactive selenium present in the starting material. After removing the pentane by distillation dimethyl diselenide-$Se^{75}$ is converted to selenomethionine using the method previously described.

In this way products having a radiochemical purity of essentially 100 percent can be prepared with a yield of approximately 50 percent or better.

The invention is also applicable to the preparation of the optical isomers of selenomethionine. Unlike some previously known processes, the method of this invention does not cause racemization of the optical isomer. For example, the dimethyl diselenide was reduced with sodium in liquid ammonia as before and the sodium methaneselenol reacted with 3.3 g. of L-α-amino-γ-bromobutyric acid hydrobromide. Thin layer chromatography of the L-selenomethionine-$Se^{75}$ indicated a radiochemical purity of 93 percent. Yield was 59 percent.

By substituting other halogenated α-amino acids for α-amino-γ-bromobutyric acid a wide range of seleno derivatives may be prepared. Among such other α-amino acids may be noted:

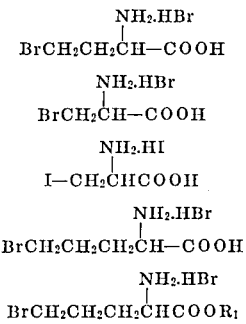

where $R_1$ is an alkyl group such as $CH_3-$, $C_2H_5-$, $C_3H_7-$, phenyl-$CH_2-$, and the like.

Also, N-substituted α-amino acids similar to the above may be used where the N-substituent is —COR with R being hydrogen or an alkyl, aryl, aralkyl or aralkoxy group such as one of the following:

—H
—$CH_3$
—$C_2H_5$
—$C_6H_5$
—$CH_2C_6H_5$
—$OCH_2C_6H_5$
—$C_6H_4$—p—$NO_2$

The N-substituent may thereafter be removed from the resulting seleno compound if desired.

In view of above, it will be seen that the several objects of the invention achieved and other advantageous results attained.

As various changes could be made in the above methods without departing from the scope of the invention, it is intended that all matter contained in the above description shall be interpreted as illustrative and not in a limiting sense.

What is claimed is:

1. The method of making a seleno compound which comprises reacting a halogenated α-amino acid derivative corresponding to the formula:

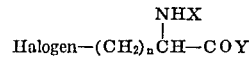

wherein $n$ is a number from 1 to 3,

X is selected from the group consisting of hydrogen and —COR wherein R is selected from the group consisting of hydrogen and alkyl, aryl, aralkyl and aralkoxy groups, and Y is selected from the group consisting of OH and OR, with R being alkyl, with an alkali metal methaneselenol and recovering a compound corresponding to the formula:

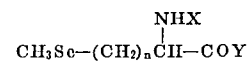

wherein $n$, X and Y are as defined above.

2. The method according to claim 1 wherein the halogenated α-amino acid derivative is selected from the group consisting of α-amino-γ-bromobutyric acid and its esters, and the alkali metal is sodium.

3. The method according to claim 1 wherein the reaction is carried out in the presence of an alkali metal alkoxide of a lower primary alcohol.

4. The method according to claim 1 wherein the alkali metal methaneselenol contains radioactive selenium.

5. The method according to claim 1 wherein the halogenated α-amino acid derivative is selected from the group consisting of L-α-amino-γ-brombutyric acid and its esters.

* * * * *